United States Patent [19]

Malone

[11] Patent Number: 4,667,625
[45] Date of Patent: May 26, 1987

[54] DOG RUN APPARATUS HAVING SHOCK ABSORBING CAPABILITY

[76] Inventor: Garry B. Malone, 19 Vermont Court, Southington, Conn. 06489

[21] Appl. No.: 800,297

[22] Filed: Nov. 21, 1985

[51] Int. Cl.$^4$ ................................................ A01K 3/00
[52] U.S. Cl. ..................................... 119/120; 254/392
[58] Field of Search ................ 119/119, 120; 104/113, 104/115, 117; 272/24; 198/678; 254/392

[56] References Cited

U.S. PATENT DOCUMENTS

| | | | |
|---|---|---|---|
| 916,081 | 3/1909 | Wiliams, Jr. et al. | 104/117 |
| 987,253 | 3/1911 | Neale | 104/115 |
| 1,233,649 | 7/1917 | Czaja et al. | 119/120 |
| 3,615,003 | 10/1971 | Rust | 198/678 |
| 4,475,755 | 10/1984 | Patton | 254/392 X |

Primary Examiner—Robert P. Swiatek
Attorney, Agent, or Firm—Robert S. Smith

[57] ABSTRACT

Apparatus for joining an associated chain or leash and an associated generally horizontally cable which includes a pulley and a generally U-shaped frame having two leg shaped members extending in generally parallel spaced relationship with the free ends thereof being closely about the sides of the pulley. All of the other axial portions of the legs are spaced further apart than the free ends. An eye bolt has a generally circular head and a shaft which extends through the U-shaped frame. The shaft has a first spring seat fixed to the end of the shaft remote from the circular end. The shaft is disposed in generally parallel relationship to the first and second legs of the frame. A second spring seat is mounted on the surface of the U-shaped frame intermediate the first and second legs. A coil shaped compression spring extends intermediate the first and second spring seats and limits relative motion between the eye bolt and the frame. Stop structure, carried on the eye bolt, limits the relative motion between the eye bolt and the frame to control minimum preload on the spring.

4 Claims, 3 Drawing Figures

DOG RUN APPARATUS HAVING SHOCK ABSORBING CAPABILITY

BACKGROUND OF THE INVENTION

The invention relates to apparatus for limiting movement of an animal such as a dog. It is common for people to tie their dogs on so-called dog runs. Typically such apparatus has a horizontal wire or a cable strung between two trees or other supports.

The prior art includes the apparatus described in U.S. Pat. Nos. 2,953,116; 1,563,212; 1,233,649; and 729,912.

In the most simple form, the prior art apparatus will have a ring which extends around the cable and this ring will be attached to a chain which is attached to the dog. This form of the apparatus has substantial disadvantages in that the apparatus is highly vulnerable to the shocks which result from the dog running after dogs, cats or people and imposing a sudden stress on the assembly as the dog reaches the outermost point permitted by the apparatus.

Another problem of such apparatus is that the ring surrounding the cable typically requires the user to take the cable down in order to replace the ring. In at least some cases, the cable must be taken down to replace the chain extending from the ring to the dog.

It is an object of the invention to provide apparatus which is highly resistant to the forces imposed.

It is another object of the invention to provide apparatus which can be partially replaced without the necessity for replacing the entire assembly.

It is another object of the invention is to provide apparatus which will permit replacement of the assembly in accordance with the invention without the necessity of taking down the cable.

A further object of the invention is to prevent injury to the dog or other animal.

Still another object of the invention is provide a shock absorbing unit which is itself structurally strong and, thus, not vulnerable to breakage.

Still another object of the invention is to provide apparatus which is relatively inexpensive to manufacture.

SUMMARY OF THE INVENTION

The foregoing objects and other objects and advantages which shall become apparent from the detailed description of the preferred embodiment may be attained in apparatus for joining an associated chain or leash and an associated generally horizontally extending cable. The apparatus includes a pulley and a generally U-shaped frame having two leg shaped members extending in generally parallel spaced relationship with the free ends thereof being closely spaced about the sides of the pulley. All of the other axial portions of the legs are spaced further apart than the free ends. An eye bolt has a generally circular head and a shaft which extends through the U-shaped frame. The shaft has a first spring seat fixed to the end of the shaft remote from the circular end. The shaft is disposed in generally parallel relationship to the first and second legs of the frame. A second spring seat is mounted on the surface of the U-shaped frame intermediate the first and second legs. A coil shaped compression spring extends intermediate the first and second spring seats and limits relative motion between the eye bolt and the frame. Stop means, carried on the eye bolt, limits the relative motion between the eye bolt and the frame to control minimum preload on the spring.

The pulley may be supported on the frame by a bolt. the pulley may include a ball bearing mounting cooperating with the bolt.

BRIEF DESCRIPTION OF THE ACCOMPANYING DRAWING

The invention will be better understood by reference to the accompanying drawing in which.

DESCRIPTION OF THE PREFERRED EMBODIMENT

Figure 1:
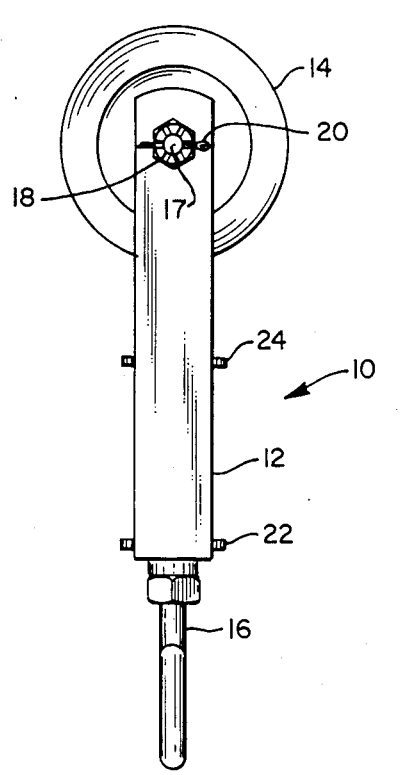
FIG. 1 is a side elevational view of a preferred form of the apparatus in accordance with the invention.
Figure 2:
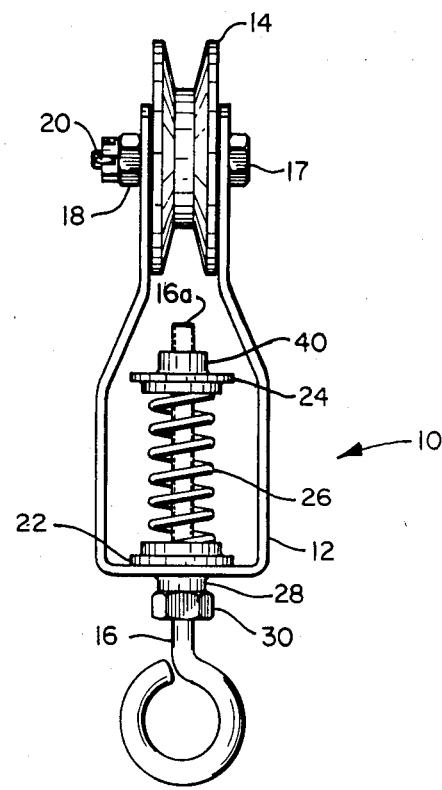
FIG. 2 is a front elevational view of the apparatus shown in FIG. 1.
Figure 3:
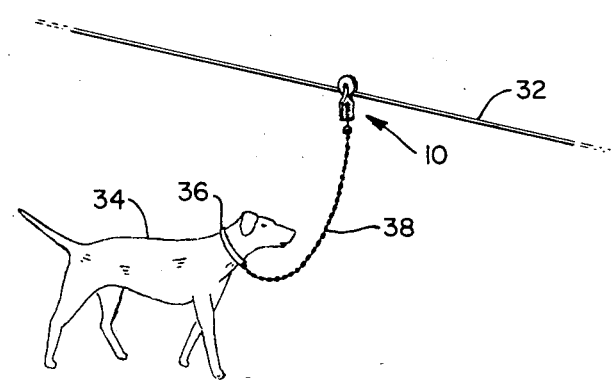
FIG. 3 is a perspective view showing the apparatus in accordance with the invention in use.

Referring now to FIGS. 1–3, there is shown a shock absorbing apparatus 10 in accordance with one form of the invention. The apparatus 10 includes a generally U-shaped frame 12. The frame 12 is ordinarily manufactured of a single piece of flat metal stock such as aluminum or steel. The frame 12 is generally U-shaped and has generally opposed leg shaped members. The free ends of the leg shaped members are spaced closer together than the remainder of the leg shaped members, as will be apparaent from FIG. 2. More specifically, an axial section of each leg shaped member tapers inwardly so as to be closely spaced from the sides of a pulley 14. The frame 12 ordinarily will have an aperture (not visible) through which an eye bolt 16 freely extends, with a shaft 16A thereof in generally parallel relationship to the legs of the frame 12. The frame 12 also has aligned holes (not visible) in the free ends of the generally parallel legs of the frame 12. A bolt 17 extends through these holes and mounts the pulley 14. A castellated nut 18 engages the bolt 17 and holds the free ends of the frame 12 around the pulley 14. A cotter pin 20 engages the castellated nut 18 and the bolt 17 to prevent relative motion.

In other embodiments of the invention the castellated nut 18 may be replaced by various lock nuts such as the nuts commonly referred to as elastic stop nuts or other nuts having self locking threads. Alternatively, the bolt 17 may have locking threads. In still other embodiments a chemical substance may be deposited on the cooperating threads, which will prevent inadvertent loosening of the nut 18.

Mounted on the generally horizontal, as illustrated, portion of the frame 12 is a spring seat 22. Ordinarily, this spring seat 22 will be welded to the frame 12, although this is not essential. A second spring seat 24 is fixed to the shaft 16A of the eye bolt 16. This may be accomplished by welding or by other well known means. Intermediate the spring seat 22 and the spring seat 24 is a coil shaped compression spring 26.

It will be understood that in FIGS. 1 and 2 the apparatus 10 does not have any tension force imposed between the eye of the eye bolt 16 and the pulley 14. When the apparatus 10 is being stressed by a load, such as by a dog pulling on his chain 38, the spring 26 will be compressed further. When the apparatus 10 is unstressed, the coil shaped compression spring 26 is provided with a minimum preload by the combination of a boss 28, which is welded to the bottom of the horizontal (as illustrated) section of the frame 12. The boss 28 cooperates with a stop 30 mounted on the shaft 16A of the eye bolt 16. In the illustrated embodiment, the stop 30 is merely a conventional hexagonal nut which is threaded onto the existing threads of the eye bolt 16. It will be understood that the purpose of the stop 30 is to provide at least some surface to surface contact between the stop 30 and the cooperating boss 28. This surface to surface contact is preferably to point or even line contact which would be more vulnerable to being damaged when a dog 34 sequentially pulls on the chain 38 to cause compression of the spring 26 and releases the tension to cause the stop 30 to snap back against the boss 28. In other embodiments alternative structures will be provided. It will be apparent to those skilled in the art that as the stop 30 impacts the boss 28, the compression spring 26 cannot expand any further. The distance between the spring seats 22, 24 is chosen to be a distance which is less than the free height of the compression spring 26. Thus, the compression spring 26 will always have at least some preload on it. This ensures that the compression spring 26 will not tend to fall out of either of the spring seats 22, 24.

It will be further understood that the spacing intermediate the frame 12 and the pulley 14 has been made to be very small so that there will be no tendency for a cable 32 to enter the space intermediate the pulley 14 and the frame 12.

In operation, even the large dog 34, when tied by a collar 36 and the chain 38 to the apparatus 10, which is, in turn, mounted on the cable 32, is provided with means which will avoid injury to the animal as well as to the apparatus 10 if the dog 34 should, for example, run vigorously after another dog or cat. Because of the sturdy construction of the apparatus 10, the possiblity of breakage of the apparatus 10 is very remote. The spring action of the apparatus 10 helps to ensure that the dog 34 will not tend to break even the chain 38 or the collar 36, in part, because of the spring action produced by the compression spring 26. Similarly, the possibility of injury to the animal is relatively reduced.

A major advantage of the invention over certain prior art apparatus is that even if the pulley 14 should become worn and require replacement, it is not not necessarily to take the cable 32 down from the supporting structure (not shown) as is usually necessary in the prior art structure. Instead, with the apparatus 10 in accordance with the invention the user may merely remove the cotter pin 20, remove the nut 18, withdraw the bolt 17, remove the old pulley 14, and install the new pulley 14. Similarly, if the compression spring 26 were damaged, it is possible to replace that spring 26 in the apparatus 10 in accordance with the invention in that the spring seat 24 will ordinarily be secured by a removable nut 40, which allows easy replacement of this compression spring 26.

It will be understood that in typical prior art apparatus the usual repair would require taking the cable 32 down in order to thread the new cable 32 under a pulley such as 14 or some other physically equivalent structure.

The material used for the construction of the apparatus may vary in specific embodiments, although typically they will be of steel or aluminum. An advantage of aluminum is the resistance to corrosion.

Another advantage of the invention is that the apparatus 10 is relatively "bottom" heavy. In other words, the structure will tend to naturally hang downward from the cable 32 and, thus, will be less likely to improperly engage the cable 32.

The invention has been described with reference to its illustrated preferred embodiment. Persons skilled in the art may, upon exposure to the teachings herein, conceive variations in the mechanical development of the components therein. Such variations are deemed to be encompassed by the disclosure, the invention being delimited only by the appended claims.

Having thus described my invention, I claim:

1. Apparatus for joining an associated chain or leash and an associated generally horizontally extending cable, which comprises:
   a pulley, said pulley being dimensioned and configured to ride on top of the associated cable;
   a generally U-shaped frame having two leg shaped members extending in generally parallel spaced relationship with the free ends thereof being closely spaced about the sides of said pulley, all of the other axial portions of said legs being spaced further apart than the free ends;
   an eye bolt having a generally circular head and a shaft extending through said U-shaped frame, said shaft having a first spring seat fixed to the end of said shaft remote from said circular end, said shaft being disposed in generally parallel relationship to said first and second legs of said frame;
   a second spring seat being mounted on the surface of said U-shaped frame intermediate said first and second legs, a coil shaped compression spring extending intermediate said first and second spring seats and limiting relative motion between said eye bolt and said frame; and
   stop means carried on said eye bolt, said stop means limiting the relative motion between said eye bolt and said frame to control minimum preload on said spring.

2. The apparatus as described in claim 1, wherein: said pulley is supported on said frame by a bolt.

3. Apparatus for joining an asosciated chain or leash and an associated generally horizontally extending cable, which comprises:
   a pulley, said pulley being dimensioned and configured to ride on top of the associated cable;
   a generally U-shaped frame having two leg shaped members extending in generally parallel spaced relationship with the free ends thereof being closely spaced about the sides of said pulley, all of the other axial portions of said legs being spaced further apart than the free ends;
   an eye bolt having a generally circular head and a shaft extending through said U-shaped frame, said shaft having a first spring seat fixed to the end of said shaft remote from said circular end, said shaft being disposed in generally parallel relationship to said first and second legs of said frame;
   a second spring seat being mounted on the surface of said U-shaped frame intermediate said first and second legs, a coil shaped compression spring extending intermediate said first and second spring seats and limiting relative motion between said eye bolt and said frame;
   said apparatus having at least the majority of the weight of its weight disposed below the associated cable; and
   stop means carried on said eye bolt, said stop means limiting the relative motion between said eye bolt and said frame to control minimum preload on said spring.

4. The apparatus as described in claim 3, wherein: said pulley is supported on said frame by a bolt.

* * * * *